Jan. 26, 1960

C. REHLANDER 2,922,280

HYDRAULIC FEED ARRANGEMENT

Filed Dec. 17, 1956

INVENTOR:
CONN REHLANDER
BY *Marzall, Johnston, Cook & Root*
ATT'YS

Jan. 26, 1960     C. REHLANDER     2,922,280
HYDRAULIC FEED ARRANGEMENT
Filed Dec. 17, 1956     13 Sheets—Sheet 2

INVENTOR:
CONN REHLANDER
BY
ATT'YS

Jan. 26, 1960 C. REHLANDER 2,922,280
HYDRAULIC FEED ARRANGEMENT
Filed Dec. 17, 1956 13 Sheets-Sheet 3

INVENTOR:
CONN REHLANDER
BY
Marzall, Johnston, Cook & Root
ATT'YS

Jan. 26, 1960     C. REHLANDER     2,922,280
HYDRAULIC FEED ARRANGEMENT
Filed Dec. 17, 1956     13 Sheets-Sheet 4

INVENTOR:
CONN REHLANDER
BY
ATT'YS

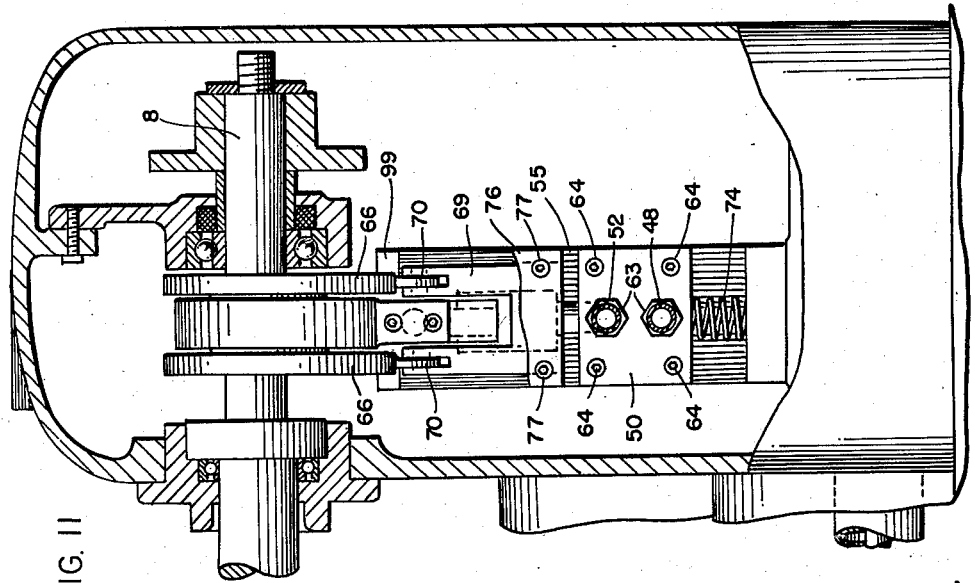
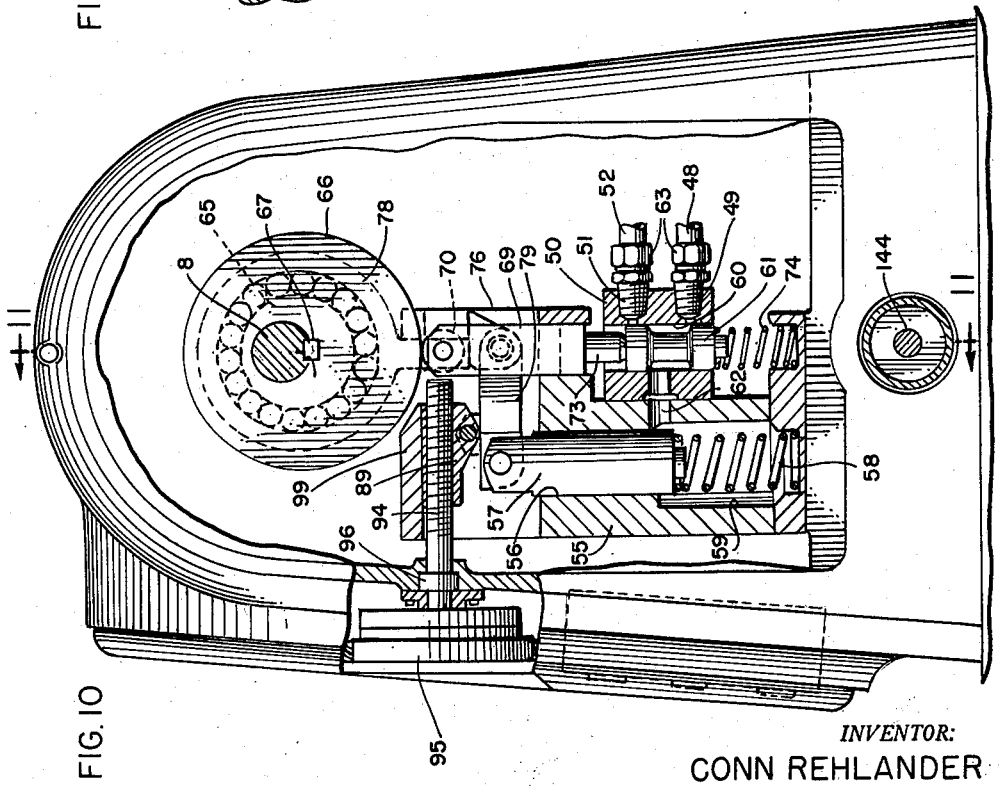

Jan. 26, 1960
C. REHLANDER
2,922,280
HYDRAULIC FEED ARRANGEMENT
Filed Dec. 17, 1956
13 Sheets-Sheet 6
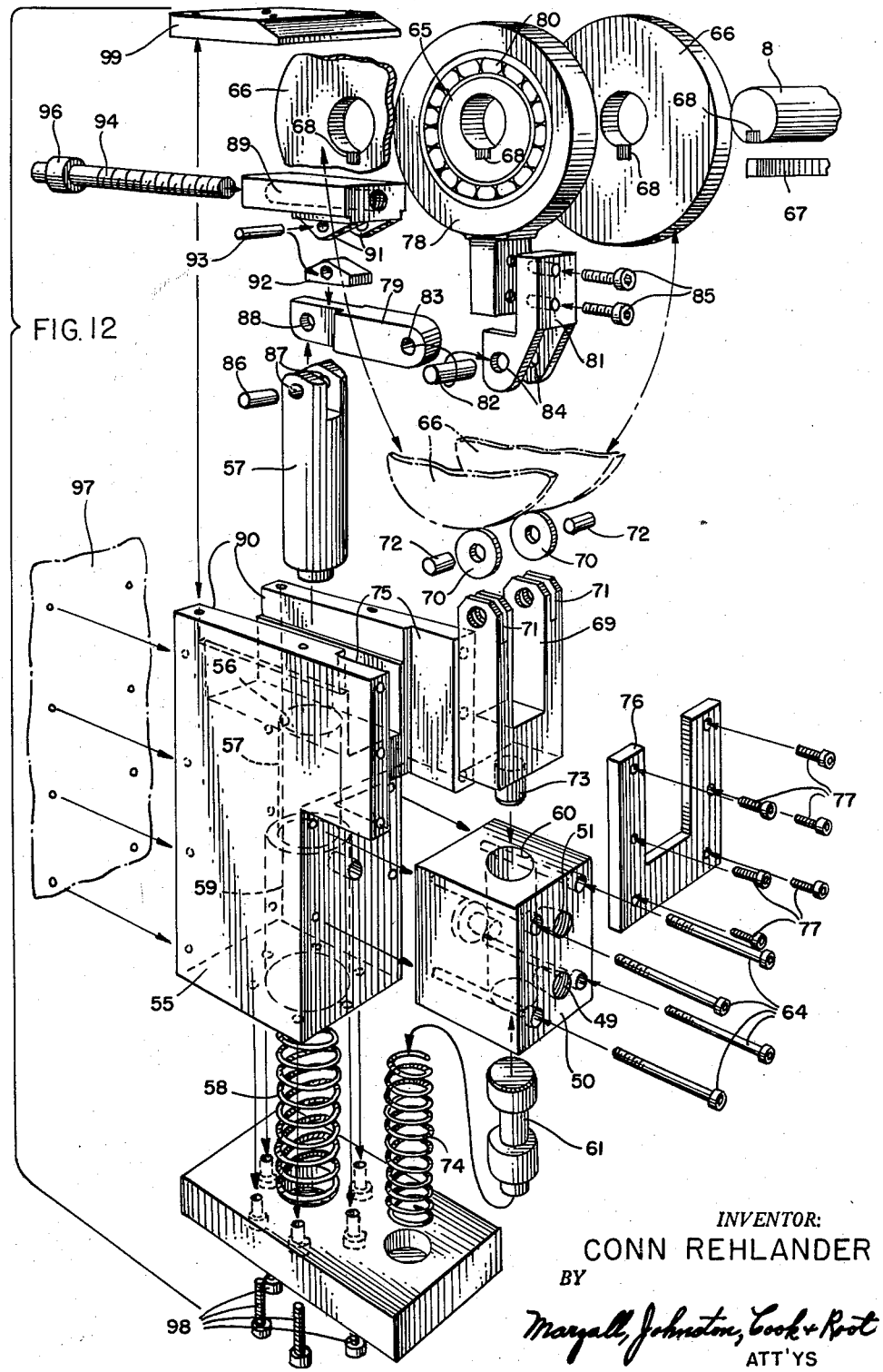
INVENTOR:
CONN REHLANDER
BY
Mayall, Johnston, Cook & Root
ATT'YS

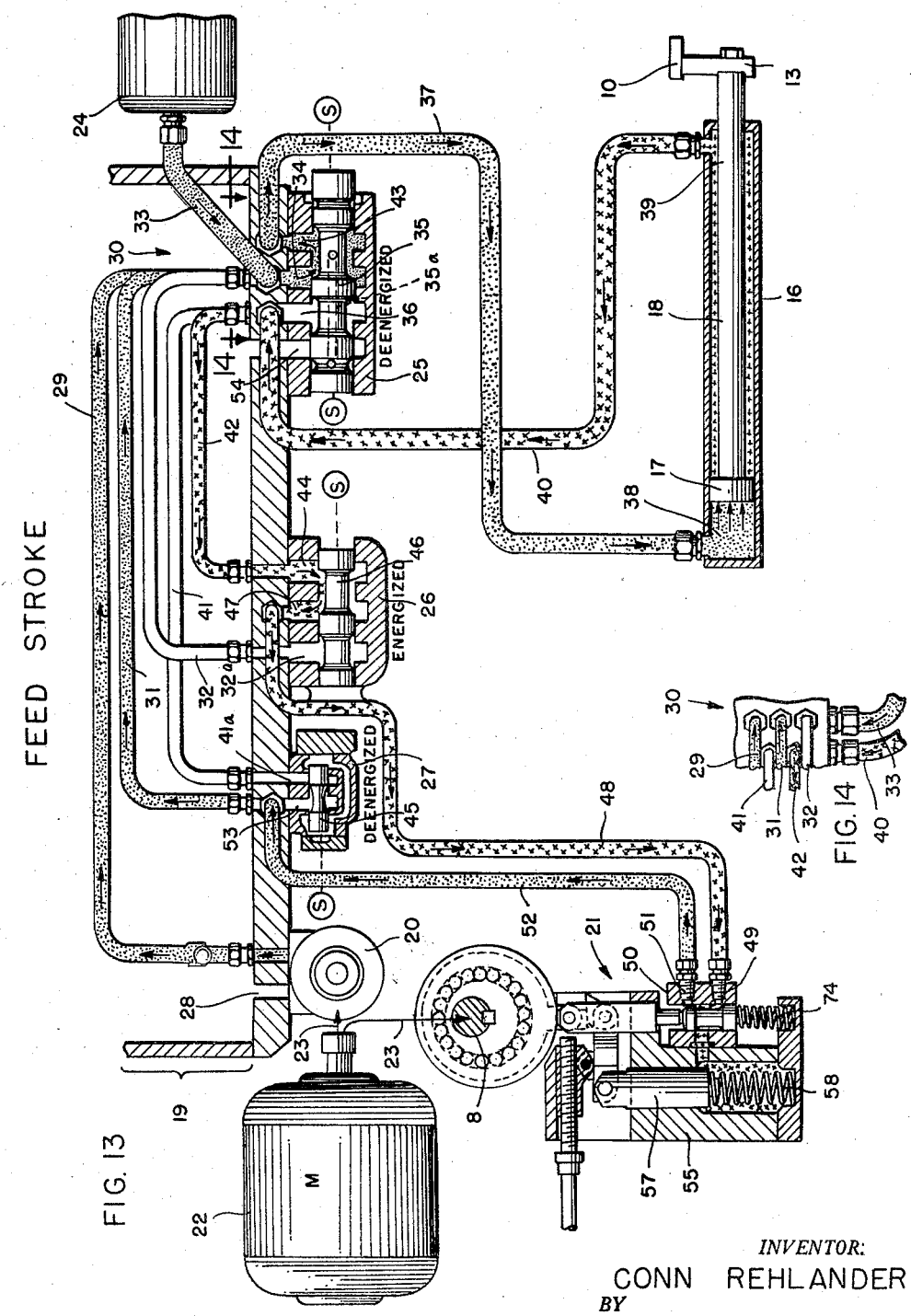

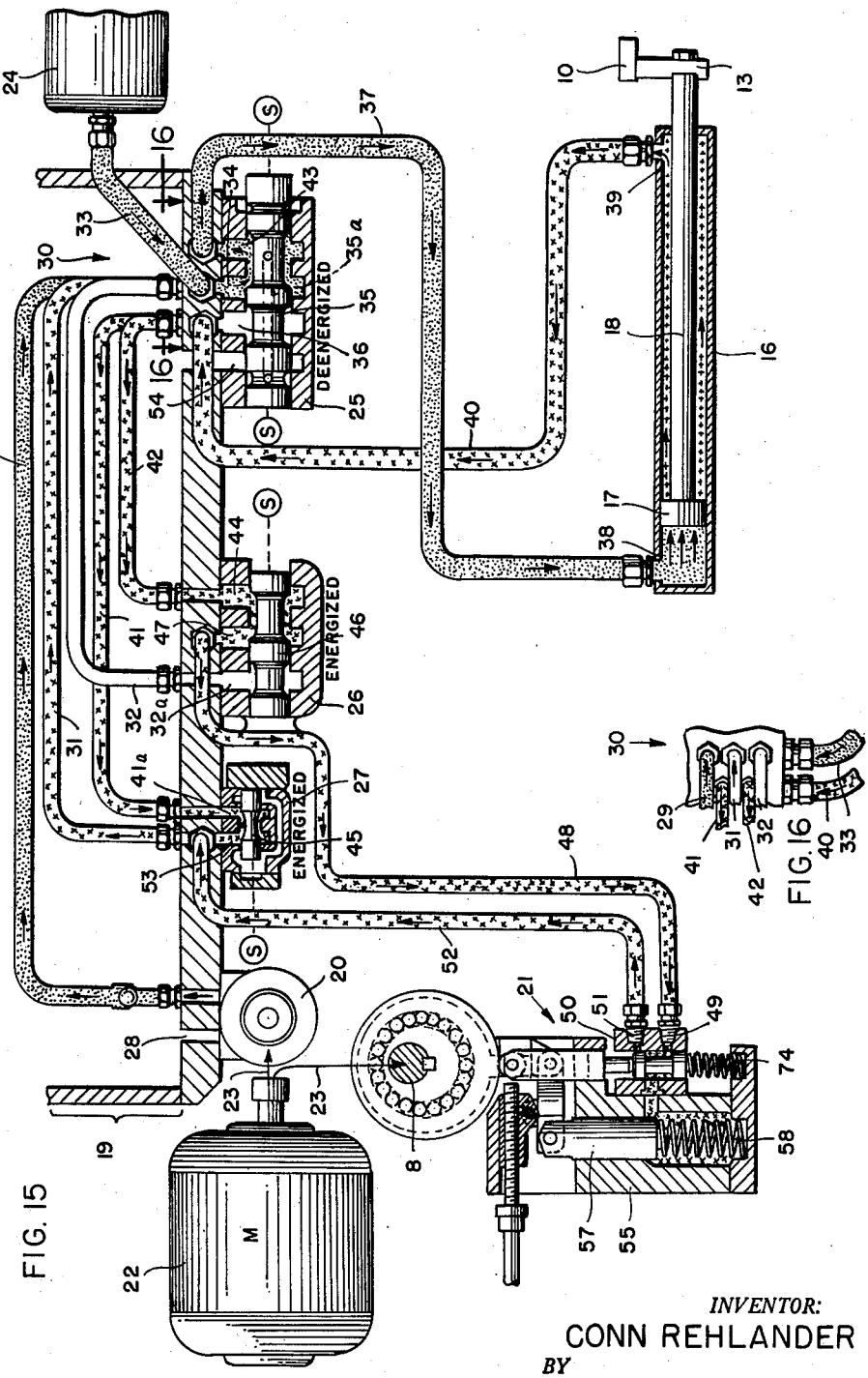

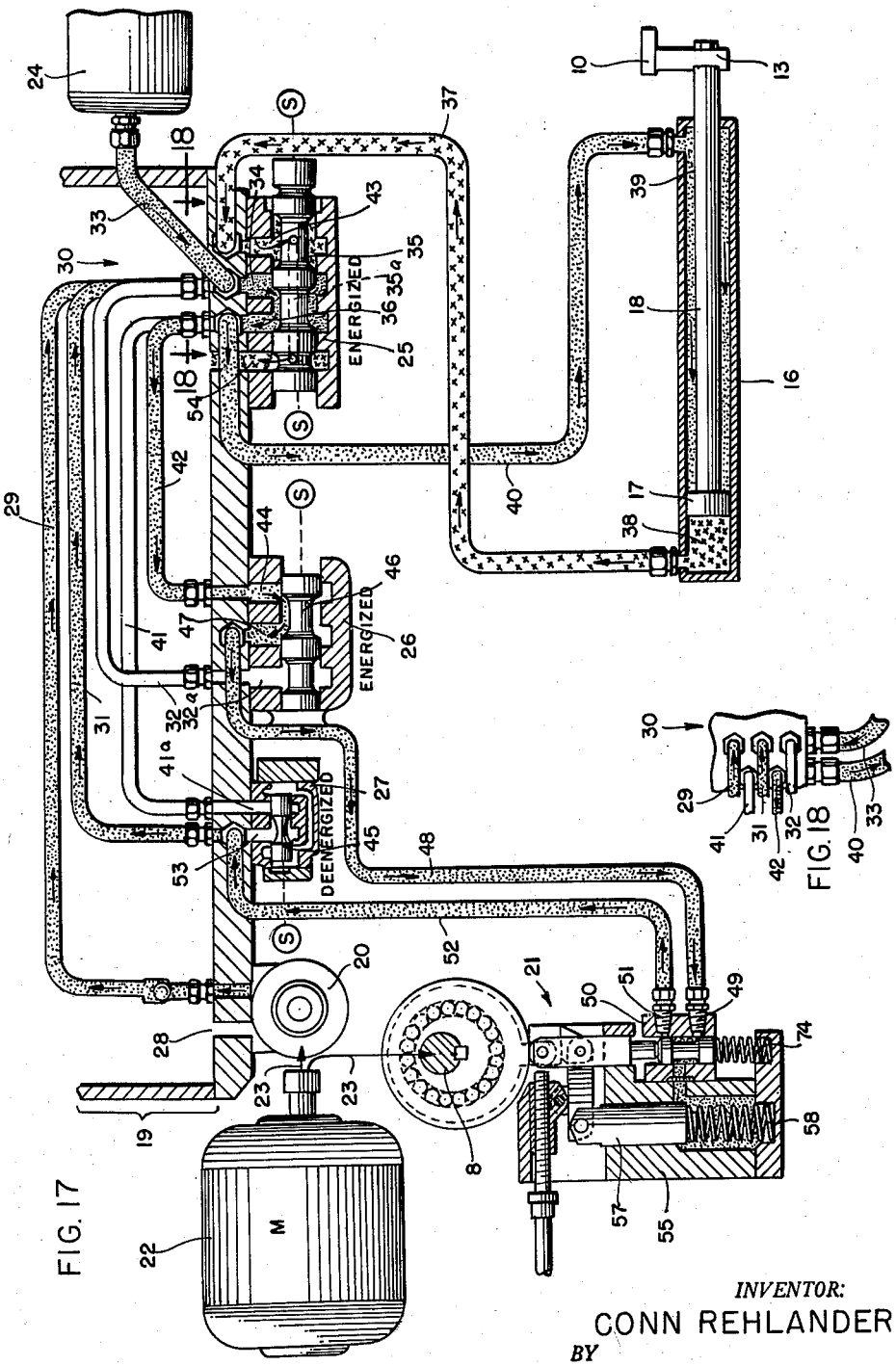

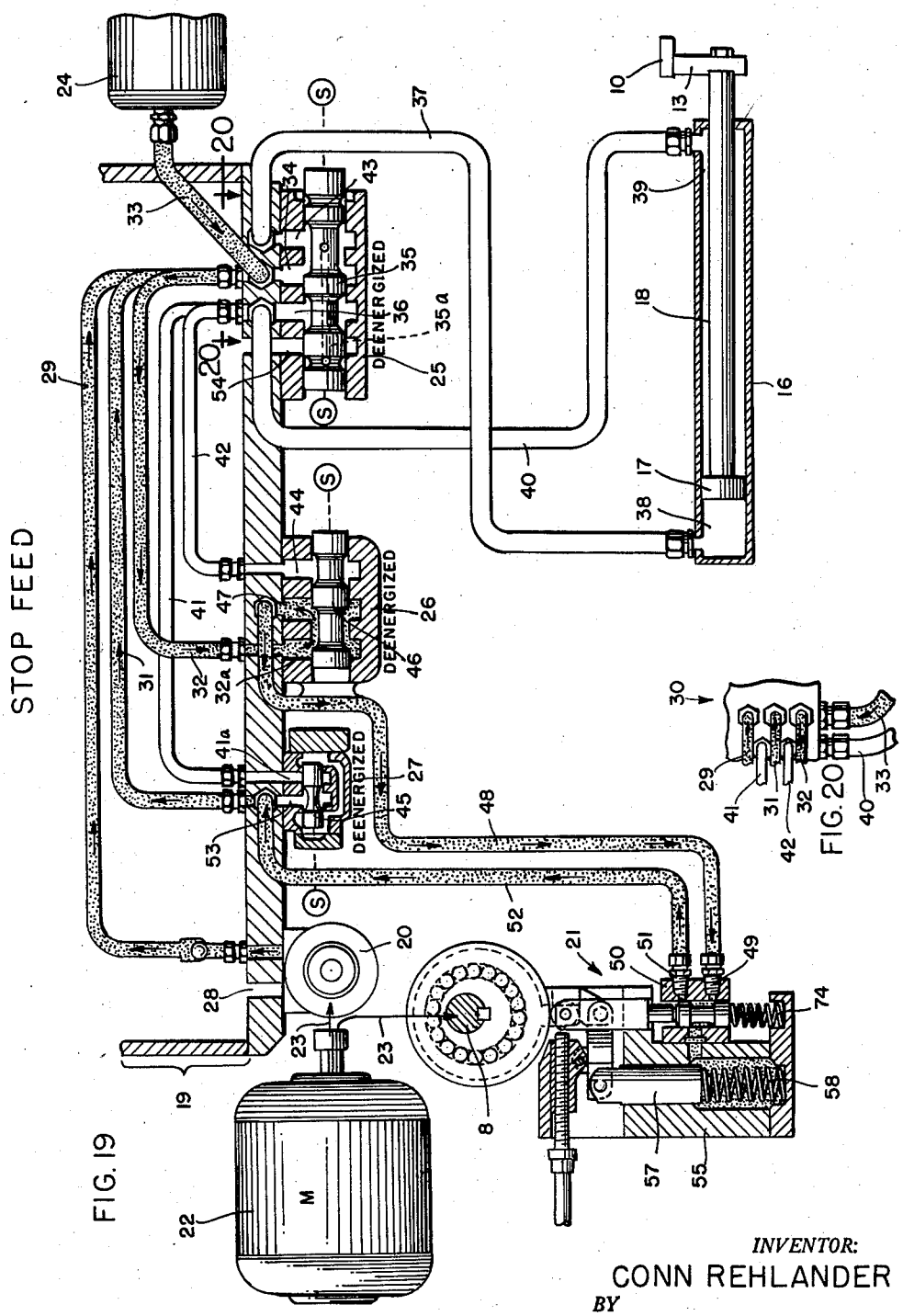

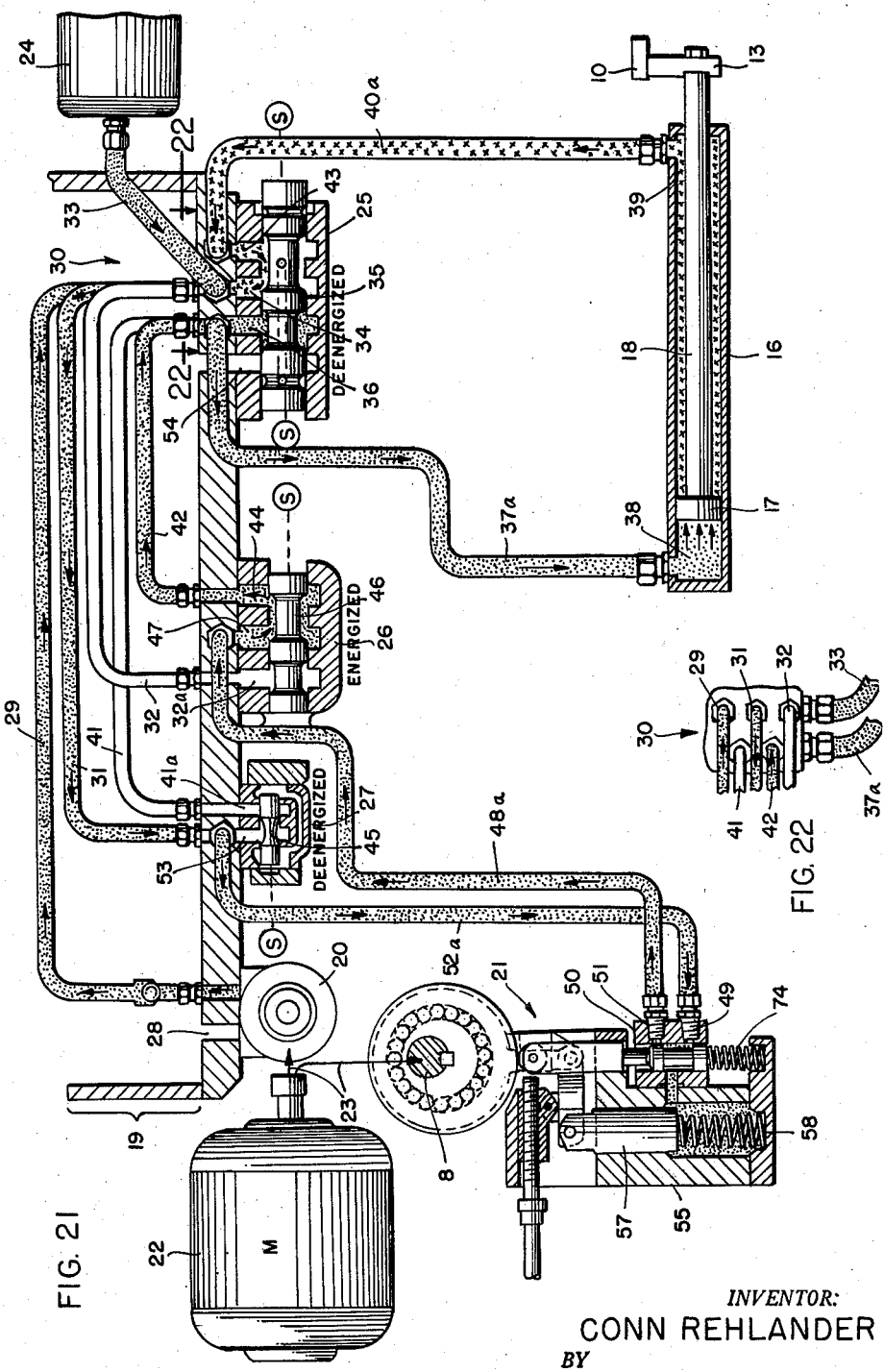

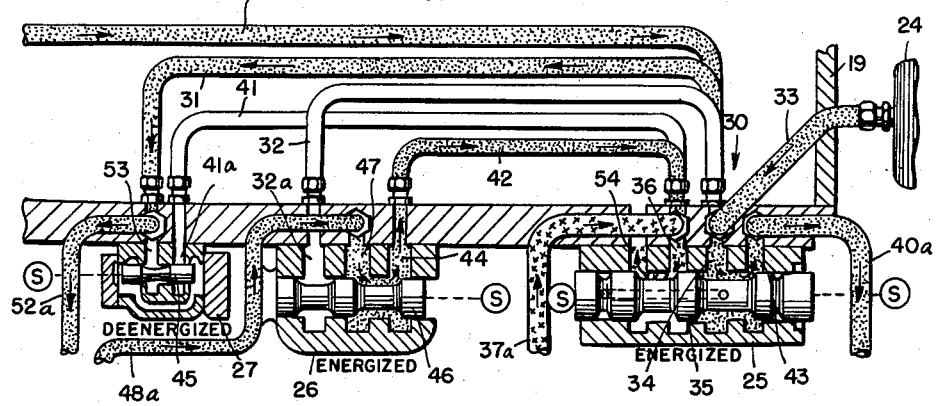
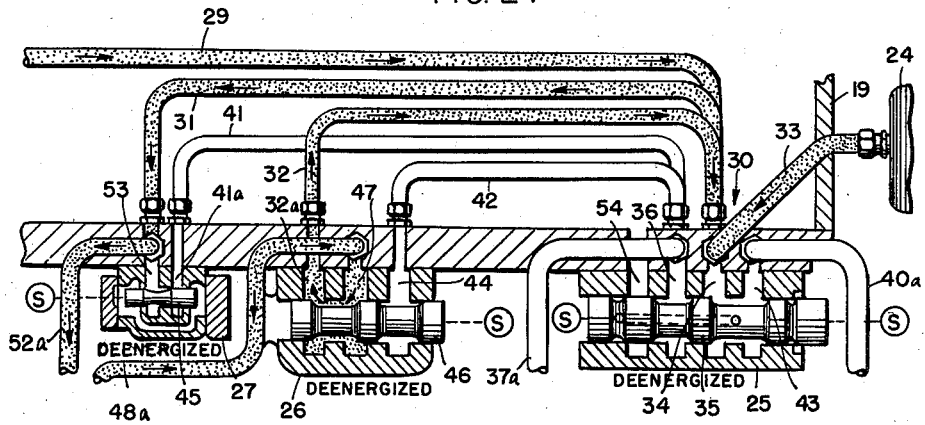
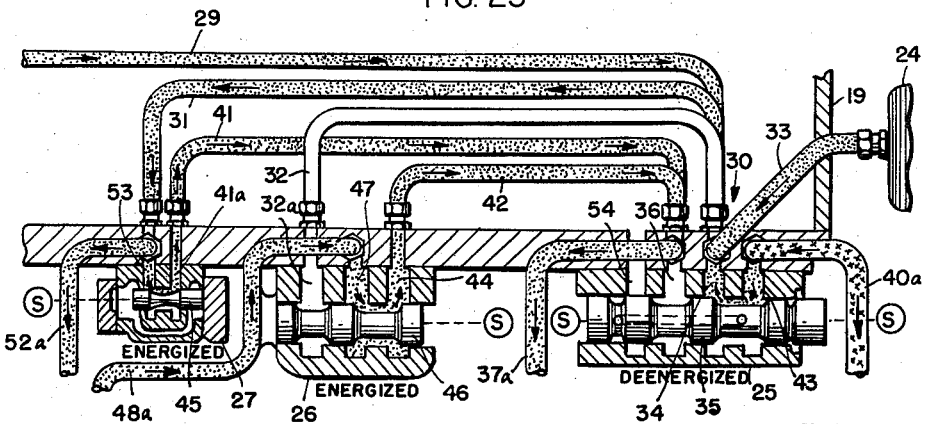

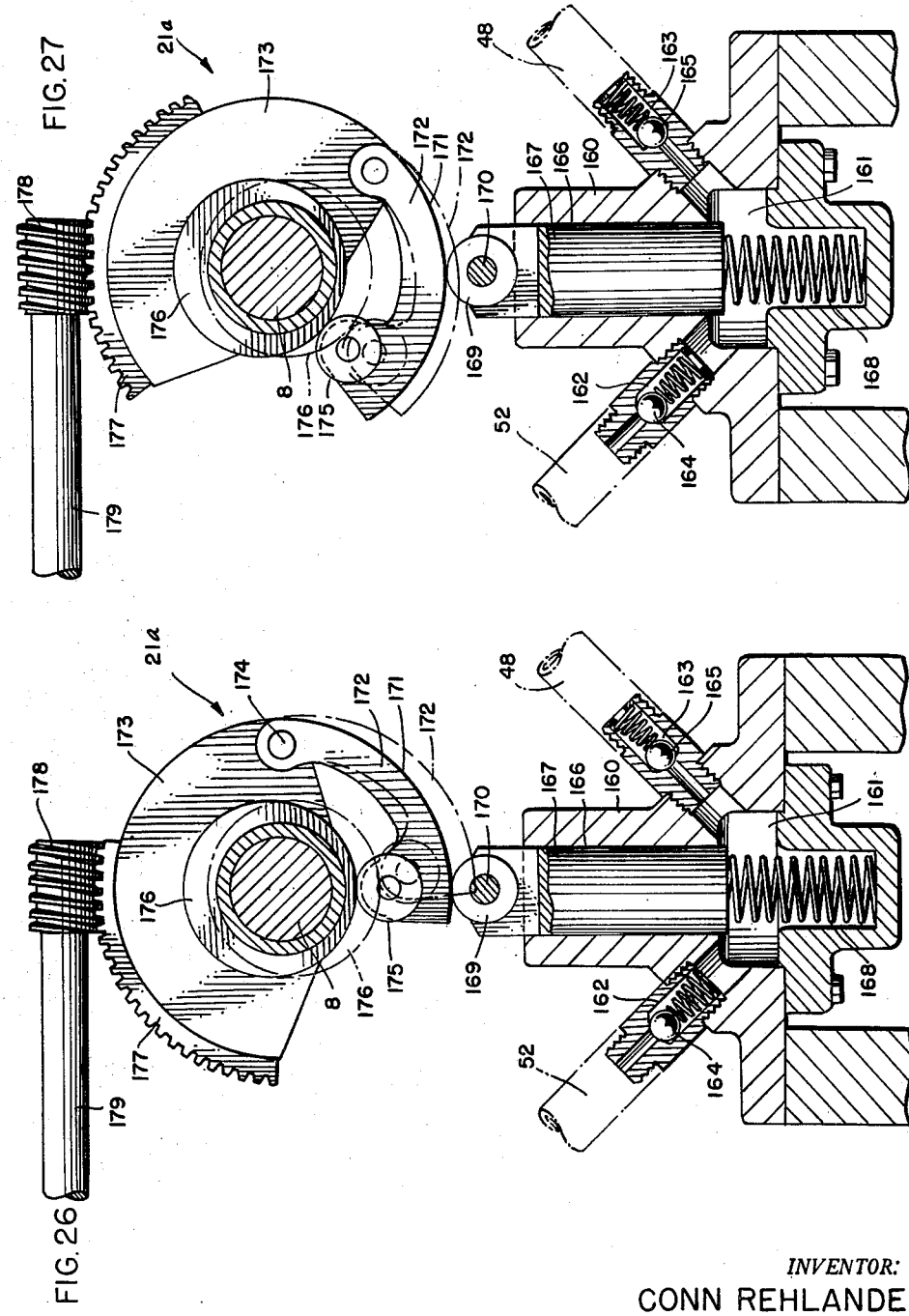

United States Patent Office 2,922,280
Patented Jan. 26, 1960

2,922,280

HYDRAULIC FEED ARRANGEMENT

Conn Rehlander, La Porte, Ind., assignor to U.S. Slicing Machine Company, Inc., La Porte, Ind., a corporation of Indiana Application December 17, 1956, Serial No. 628,636

8 Claims. (Cl. 60—51)

This invention relates to machines wherein a workpiece or substance is fed by increments of travel toward a slicing knife or other device for processing the workpiece or substance, and more particularly, this invention relates to a hydraulically operated machine for slicing foodstuffs such as bacon, frozen meat, and the like.

This invention consists generally of a new and improved hydraulic arrangement wherein a cylinder containing a piston is coupled to move and feed the substance to be sliced toward a revolving knife. The piston is moved with controlled increments of travel synchronized with the knife such that the substance will be at rest during each knife slicing operation and will be moved forwardly between the successive operations. The hydraulic arrangement may include a metering pump for discharging controlled amounts of fluid to or from the cylinder which will determine the increments of travel of the piston.

It is an object of this invention to provide a hydraulic arrangement for advancing a substance to be sliced forwardly toward the revolving knife with controlled increments of travel to facilitate the knife slicing operation; the increments of travel being determined by a metering pump wherein a piston is reciprocated by an eccentric operated lever which oscillates about a controllable fulcrum point such that the amount of piston displacement may be adjusted by varying the positioning of the fulcrum.

A further object of this invention is to provide a hydraulic system with a controlled valve arrangement wherein the piston may move selectively in (1) a feed stroke such that the piston moves forwardly in controlled increments of travel to gradually feed the substance toward the revolving slicing knife, (2) a rapid return stroke, or (3) a rapid forward stroke to advance the substance quickly toward the knife and to a cutting position, or (4) wherein the piston may remain stationary in a "stop feed" position.

A still further object of this invention is in the provision of a hydraulic arrangement for controlling the operation of a piston in a cylinder, wherein controlled amounts of fluid may be discharged to or from the cylinder.

Another object is to provide a hydraulic device for depressing and holding a slab or substance to be sliced with a controlled pressure exerted downwardly on the slab with a plurality of fingers or presser members such that the slab is held firmly during each slicing operation.

A more complete understanding of the present invention, its mode of operation, and its advantages, may be gathered from further reading of this specification, together with an inspection of the accompanying drawings in which:

Fig. 10 is an enlarged vertical section along the line 10—10 of Fig. 1 and specifically showing the controllable stroke metering pump employed in the hydraulic system of this invention;

Fig. 11 is a vertical section along the line 11—11 of Fig. 10;

Fig. 12 is an exploded view of the controllable stroke metering pump of this invention, each element therein being shown in perspective;

Fig. 13 is a semi-schematic diagram of the hydraulic system with certain components thereof being illustrated in section and to scale; the positioning of the valves and the hydraulic flow specifically shown in Fig. 13 corresponding to the feed stroke of the piston;

Fig. 14 is a fragmentary horizontal plan view along the line 14—14 of Fig. 13 and showing particularly the connections and flow of hydraulic fluid through the first fluid valve during the feed stroke;

Fig. 15 is a semi-schematic diagram similar to Fig. 13 but showing the valves positioned for the rapid forward stroke of the piston;

Fig. 16 is a fragmentary horizontal plan view along the line 16—16 of Fig. 15 and illustrating specifically the flow of fluid through the first valve during the rapid forward stroke of the piston;

Fig. 17 is a semi-schematic diagram similar to Figs. 13 and 15 but showing the valve positioning for the rapid return stroke of the piston;

Fig. 18 is a horizontal plan view along the line 18—18 of Fig. 17 and showing the fluid flow of the first valve during the rapid return stroke;

Fig. 19 is a semi-schematic diagram similar to Figs. 13, 15, and 17, but wherein the valves are positioned to hold the piston stationary in a "stop feed" position;

Fig. 20 is a horizontal plan view along the line 20—20 of Fig. 19 and showing the fluid flow with respect to the first valve therein, illustrating the flow of fluid in the first valve during the "stop feed" position;

Fig. 21 is a partially schematic view of a modified hydraulic system with certain components shown in section, illustrating the positions of the valves and the directions of hydraulic flow corresponding to an alternate feed stroke where the fluid is metered into the cap end of the actuating cylinder;

Fig. 22 is a fragmentary top plan view taken substantially along line 22—22 of Fig. 21 and illustrating the hydraulic flow at the return valve during the alternate feed stroke;

Figure 1:
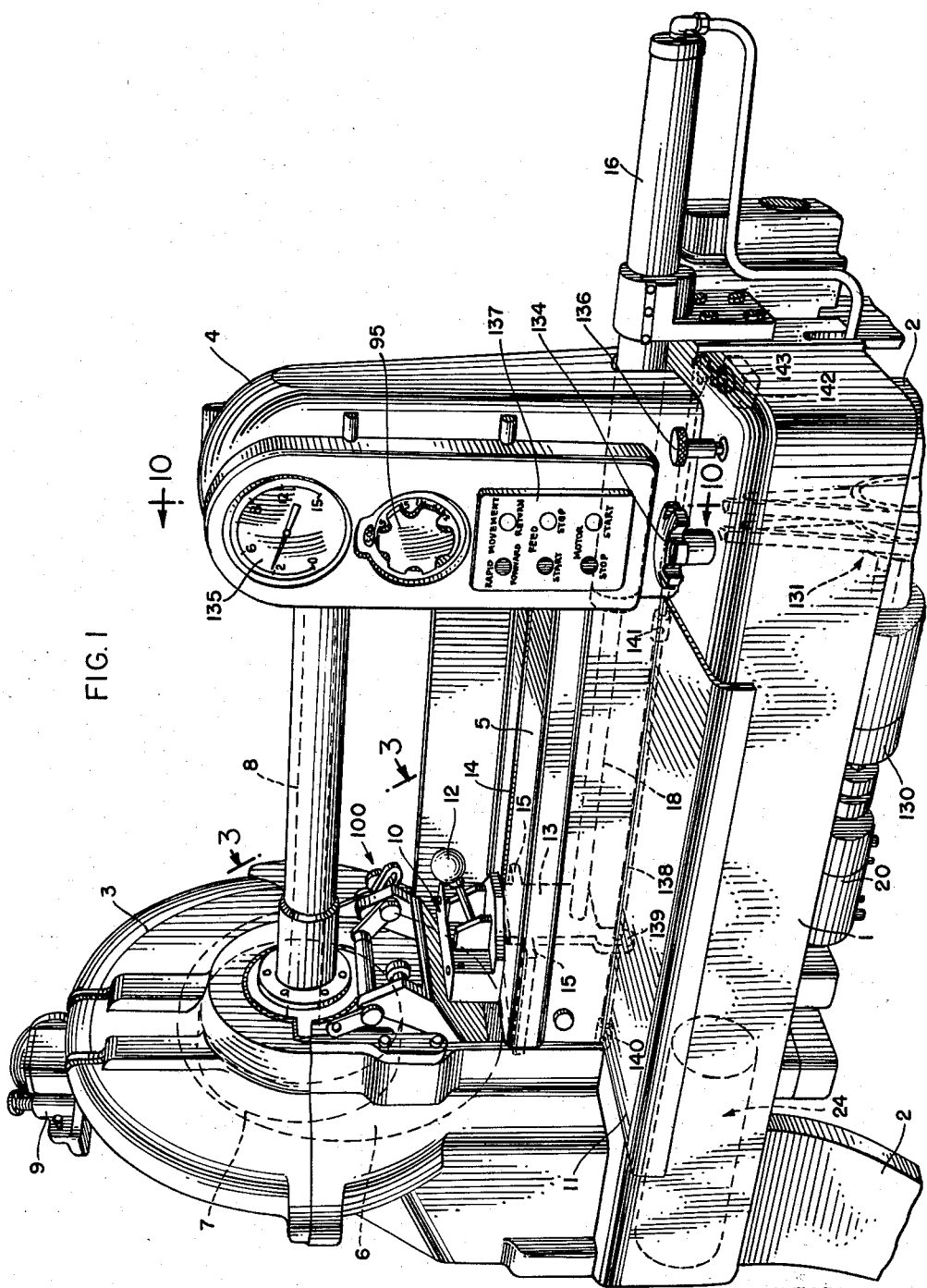
Fig. 1 is a perspective view of a slicing machine constructed in accordance with the teachings of this invention.

Figs. 23, 24, and 25 are partially fragmentary schematic views of the modified hydraulic system of Fig. 21, illustrating the valve positions and the hydraulic flow during the rapid return stroke, the stop feed, and the rapid forward stroke, respectively;

Fig. 26 is an elevational view with certain parts in section and certain parts in dotted lines of a modified variable stroke metering pump which may be utilized in place of that shown in Figs. 10, 11, and 12; and Fig. 27 is a view similar to Fig. 26 but illustrating certain movable parts in different positions.

The slicing machine of this invention comprises generally a stationary frame 1 mounted upon legs 2 and having a knife housing 3 at the forward end thereof and a pedestal housing 4 at the rear end. The machine has a bed 5 upon which a slab of bacon, frozen meat, or the like, may be placed for slicing. A disk knife 6 is contained in the housing and mounted on a planetary assembly 7 whereby the knife spins about its own axis and revolves about a shaft 8 in a planetary manner. A knife sharpening assembly 9 may be included as a portion of the knife housing 3.

A food or slab gripper assembly 10 is mounted to move forwardly along the bed 5 of the machine and to engage and hold the substance to be sliced such that the substance is fed to the knife 6. A ready-table 11 is positioned on an operator's side of the machine such that a slab or substance may be placed in a ready position while the machine is slicing a previous slab. When the slicing of one slab is completed, the gripper 10 returns quickly to an initial starting point to the right, and an operator may release the button end by movement of a handle 12 on the gripper 10 thereby clearing the bed 5 for a new slab or substance which can be quickly moved thereto from the ready-table 11.

The gripper assembly 10 contains an assembly 13 extending downwardly through a slot 14 in the bed 5 of the machine. The downward extension is provided with side flanges 15 for convenient slide mounting in rails below the bed 5.

A hydraulic cylinder 16, Fig. 1, contains a piston 17, Figs. 13, 15, 17 and 19, and a piston rod 18 which is rigidly connected between the piston 17 and the downward extension 13 from the gripper 10, Fig. 1. Thus, as the piston 17 is moved within the cylinder 16, the gripper or substance engaging means 10 is likewise moved, since the piston rod 18 and the downward extension 13 constitutes a mechanical coupling therebetween. Thus, the movement of the food gripper 10 results from movement of the piston 17 which is controlled hydraulically and may be best understood with reference to Figs. 13–20.

The hydraulic circuit (system), Fig. 13, includes the cylinder 16 with the piston 17 therein, a reservoir 19 for containing oil at atmospheric or low pressure, a high pressure pump 20 and a metering pump 21. A motor 22 is mechanically coupled to drive the high pressure pump 20 and the metering pump 21, as indicated by the arrows 23. The high pressure developed in the hydraulic fluid by the high pressure pump 20 may be stored in an accumulator 24 such that a high pressure reserve is available for rapid operation of the piston 17 and a smaller and more economical pump 20 may be used. The operation of the piston is controlled by three solenoid operated valves 25, 26, and 27.

The hydraulic system shown schematically in Figs. 13 through 20, includes arrows within various fluid conduction lines therein to indicate the direction of fluid movement. Certain of the illustrated hydraulic lines are filled in with small marks or dots indicative of fluid under high pressure. Certain other of the hydraulic lines are filled in with small crosses or x's indicative of a discharge flow from the cylinder 16. Further lines are shown with no marks or crosshatching whatsoever, and this is intended to indicate that at certain times no flow of fluid passes through those lines.

The feed stroke

Fig. 13 illustrates the hydraulic system of this invention particularly showing the positioning of the various valves during the feed stroke of the piston 17 within the cylinder 16. The high pressure pump 20 has a connection 28 to the low pressure reservoir 19, and the hydraulic fluid is pumped from the reservoir 19 into a high pressure line 29 which is connected to a valve connection block 30, Fig. 14. Other high pressure lines 31, 32, and 33 are mutually connected to the block 30, and to the high pressure line 29; thus, through the block 30, the lines 29, 31, 32 and 33 are all mutually connected for interchange of hydraulic fluid therebetween. The high pressure line 33, Fig. 13, is directly connected to the accumulator 24 and therefore high pressure fluid which may be developed over an extended interval of time by the pump 20, is stored in the accumulator 24 such that an adequate supply of high pressure fluid is available for rapid transverse movements of the piston 17 even though the cylinder 16 would then utilize more fluid than the pump 20 is capable of producing in a short interval of time. The valve 25 is a three position valve and contains a high pressure port 34 which extends into the connection block 30 and is therefore mutually connected with the lines 29, 31, 32, and 33. Further the valve 25 is a double solenoid operated valve enabling the spool to be shifted to the left or right of centered position. Since this is a spring centered valve the spool will immediately return to the centered position when the solenoids are deenergized.

The solenoid valve 25 is illustrated in a deenergized position in Fig. 13 and a spool 35 is positioned therein to connect the high pressure port 34 with a port 43 which is, in turn, connected to a line 37 extending to a cap and 38 of the cylinder 16. Thus, it may be appreciated that when the valve 25 is in a deenergized position, high pressure hydraulic fluid is applied to the cap end 38 of the cylinder 16.

A rod end 39 of the cylinder 16 is connected to a line 40 which, in turn, connects to a second chamber of the connection block 30. Two other lines 41 and 42 and another valve port 36 are likewise connected to the chamber of the connection block 30 and are therefore mutually connected to each other. As may be seen in Fig. 13, when the valve 25 is de-energized, the spool 35 is positioned to cover or block the port 36 and the hydraulic fluid must pass through the line 42 to a port 44 of the energized valve 26. The fluid is prevented from passing along the line 41 by the positioning of a valve spool 45 of the valve 27 which blocks port 41a therein. However, a valve spool 46 of the energized valve 26 is positioned to pass the fluid from the rod end 39 of the cylinder 16 and from the line 42 into the port 44 of valve 26 which is connected by the spool 46 to a port 47. The port 47 of the valve 26 is connected to a line 48 to an intake port 49 of a valve 50 associated with the metering pump 21. The metering pump 21, to be described later, functions to receive discreet increments or controlled amounts of hydraulic fluid through the intake port 49 and to eject these increments or amounts of fluid through an outlet port 51. The outlet port connects to a line 52 which, in turn, connects mutually to the line 31 and to a port 53 of the valve 27. The valve 27 is in a closed or de-energized position such that no fluid may flow therethrough and therefore the metered quantities of hydraulic fluid are returned via the line 31 to the high pressure chamber of the connection block 30 associated with the valve 25. Thus, it is seen that fluid from the rod end 39 of the cylinder 16 is passed by controlled incremental amounts through the metering pump 21 and returned to the high pressure chamber connecting to the cap end 38 of the cylinder 16. During the feed stroke, the fluid discharge from the rod end 39 of the cylinder 16 is therefore essentially returned to the cap end of the cylinder along with a makeup quantity of high pressure fluid from the high pressure source which may be the pump 20 or the accumulator 24; and the piston 17 and gripper assembly 10 advances slowly and with controlled discreet increments of travel during the feed stroke.

Rapid forward stroke

At the commencement of a slicing cycle in the machine of this invention, a substance or loaf of material to be sliced is placed on the machine bed 5, Fig. 1, and thence it is desirable that the gripper assembly 10 advance rapidly forwardly advancing the substance to the slicing position whereupon the feed stroke may be commenced. The positioning of the valves 25, 26, and 27 for the rapid forward stroke is shown in Fig. 15. As was previously described, the pump 20 receives fluid from the reservoir 19 through the connection 28 and passes the fluid under pressure through the line 29 to the connection block 30 which may be considered a source of high pressure fluid. The solenoid valve 25 is again in a de-energized position and therefore the high pressure fluid is passed through the line 37 to the cap end 38 of the cylinder 16; and the fluid discharging from the rod end 39 of the cylinder 16 and passing through the line 40, is blocked from entering the port 36 of the valve 25. The valve 26 is energized and the spool 46 is positioned to permit flow between ports 44 and 47 and to the inlet 49 of the pump 21, while blocking port 32a. The discharge fluid from the rod end 39 of the cylinder also passes through the line 41 and through the energized valve 27 and thence into the high pressure line 31 which will conduct the fluid back to the high pressure portion of the connection block 30. Thus, it may be appreciated that both the cap end 38 and the rod end 39 of the cylinder 16 are connected to the same high pressure source of fluid. As has previously been stated, the area of the cap side of the piston 17 is substantially greater than the area of the rod side of that piston, and therefore since the same high pressure is applied to both sides of the piston, a difference in force appears which is proportional to the difference in area. Because of the force difference, the high pressure fluid will move the piston 17 and the gripper assembly 10 forwardly at a relatively rapid rate. There will be a net flow of high pressure fluid into the cylinder 16 since the volume displacement at the cap end 38 is greater than the volume displacement at the rod end and any given amount of piston travel.

The metering pump 21 continues to operate during all of the various strokes of travel of the piston 17 and since the metering pump 21 is of the reciprocating type, it is necessary that hydraulic fluid continue to pass therethrough even though the pump may not be used at a given moment for its metering function. This is why part of the fluid flow from the rod end of the cylinder is directed to the inlet 49 of the pump 21 through the energized valve 26. The outlet port 51 of the metering pump 21 will pass fluid through the line 52 which connects directly with the line 31 and simply returns the fluid to the high pressure source. Thus, during the rapid forward stroke of the slicing machine, the metering pump 21 receives fluid from the high pressure source and returns the fluid back to the high pressure source.

Rapid return stroke

At the completion of each slicing operation, it is desirable that the gripper assembly 10 return or move rapidly rearwardly to permit another slab or loaf of substance to be sliced to be received upon the bed 5, Fig. 1, for the next slicing operation. Fig. 17 illustrates the valve positioning during such rapid return stroke. As was previously described, the high pressure pump 20 receives fluid from the reservoir 19 and passes the fluid through the line 29 to the connection block 30. The solenoid valve 25 is energized and the spool 35 is positioned to pass the high pressure fluid from the port 34 to the port 36 and thence to the line 40 and the rod end 39 of the cylinder 16. In this instance, it will be noted that the solenoid on the right hand end of the spool is energized to shift the spool to its right position. Fluid may discharge from the cap end 38 of the cylinder 16 through the line 37 and into the blocked port 43 of the valve 25. The reduced portion of the spool which blocks the port 43 communicates with a reduced portion of the spool which blocks the port 54 through a hole 35a in the spool, thereby connecting the cap end of the cylinder to the low pressure reservoir 19. Thus, it will be appreciated that fluid under high pressure is applied to the rod end of the cylinder 16 while the fluid of the cap end is permitted to exhaust into the low pressure reservoir; and therefore the piston 17 and the gripper assembly 10 will move rapidly rearwardly. It will be noted that except when the spool 35 is shifted to the right, the left end of the hole 35a is always blocked.

Valve 26 is energized as in the rapid forward stroke such that high pressure fluid is permitted to pass to the intake port 49 of the metering pump 21 and the fluid may discharge from the outlet port 51 of the metering pump 21 back into the high pressure line 31. Therefore, as in the rapid forward stroke, the operation of the metering pump 21 continues since fluid is permitted to flow from the high pressure source through the pump 21 and thence back to the high pressure source.

Stop feed

As described previously, the pump 20 receives fluid from the reservoir 19 and passes the fluid under high pressure to the connection block 30 which is coupled to the accumulator 24 and the high pressure lines 31 and 32. The solenoid valve 25 is de-energized during stop feed and therefore the spool 35 is positioned to block the ports 36 and 54 and to pass the high pressure fluid through the line 37 to the cap end 38 of the cylinder 16. The rod end 39 of the cylinder 16 is connected through the line 40 to the blocked port 36, Fig. 20. The port 36 is further connected to the blocked port 44 of de-energized valve 26 and the blocked port 41a of de-energized valve 27. Hence, it is impossible for fluid to work into or out of the rod end of the cylinder, and therefore impossible for the piston to move in either direction.

The solenoid valve 26 being de-energized permits ports 32a and 47 therein to be connected, and therefore, the high pressure source of fluid through the line 32 is connected to the line 48 and the intake port 49 of the metering pump. The line 52 from the outlet port 51 of the metering pump 21 connects with the high pressure line 31; and therefore, as in the cases of the rapid forward stroke and the rapid return stroke, the metering pump is permitted to continue its operation by simply receiving fluid from the high pressure source and returning the fluid thereto.

Alternate hydraulic line arrangement

Where the slicing machine of the present invention may be utilized as a frozen food slicer, the arrangement and feed stroke as illustrated in Fig. 13 is preferred, wherein the oil is metered out of the rod end 39 of the cylinder by the metering pump 21. Since the area of the cap end of the piston 17 is about twice as large as the area of the rod end of the piston, the effect of metering oil from the rod end results in a greater movement of the piston rod 18 relative to the amount of oil which is metered therefrom. In certain situations, such as where the present invention is to be utilized as a dried beef slicer, where the slice thickness will be much smaller, it is only necessary to move the gripper 10 connected to the piston rod 18 a small distance for each slicing operation. Therefore, since a larger amount of oil can be more accurately metered, in order to accurately effect a smaller increment of movement of the piston 17, it is necessary to meter the oil into the cap end 38 of the cylinder. In other words, a given amount of oil metered into the cap end 38 of the cylinder will give a smaller increment of movement of the piston than if that amount of oil were metered out of the rod end of the cylinder.

Referring now to Figs. 21 and 22, a modified hydraulic line arrangement is illustrated which is capable of giving an alternate feed stroke. This arrangement is identical with Fig. 13 except the intake port 49 of the metering pump 21 is connected to the high pressure line 31 by the line 52a, and the outlet port 51 of the metering pump is connected to the port 47 of the feed and stop feed valve 26 by the line 48a. Further, the rod end 39 of the cylinder 16 is connected to the port 43 of the return valve 25 by the line 40a, while the cap end 38 of the cylinder is connected to the port 36 of the return valve 25 and the lines 41 and 42 by a line 37a. The positioning of all valve spools is identical with that in the feed stroke shown in Fig. 13, wherein the return valve 25 is in de-energized position, and the feed and stop feed valve 26 is in energized position, and the forward valve 27 is in the de-energized position. With the valves in these positions, the rod end 39 of the cylinder is connected to the inlet port 49 of the metering pump 21, while the cap end 38 of the cylinder is connected to the outlet port 51 of the metering pump. Also, the high pressure pump 20 and the accumulator 24 are connected into the line leading to the intake port 49 of the metering pump. Specifically, the oil leaves the outlet port 51 of the metering pump 21, and enters the port 47 of the feed and stop feed valve 26 via line 48a. The valve 26, being energized, intercommunicates the port 47 with the port 44 thereby passing the oil to the line 42 and to the connection block 30 and the port 36 of the de-energized return valve 25. Since the port 36 is blocked, the oil passes through the line 37a and to the cap end 38 of the actuating cylinder 16. From the rod end 39 of the cylinder, the oil enters the port 43 of the valve 25 through the line 40a. The spool 35 of the de-energized valve 25 intercommunicates the port 43 with the port 34, the latter being common to and communicating with the lines 29, 31, and 32. Further, the accumulator 24 communicates with the port 34 through the line 33. From the connection block there will be no flow of oil through the lines 32 and 41 because of the positioning of the valves 26 and 27. The oil leaving the valve 25 passes through the lines 31 and 52a through the intake port 49 of the metering pump 21. Inasmuch as the amount of oil leaving the rod end of the cylinder 16 upon movement of the piston 17 is insufficient to fill the cap end of the cylinder, make-up fluid or oil is obtained through the high pressure line 29 and the accumulator line 33, which as above explained, are connected into the intake port 49 of the metering pump 21. Therefore, it will be appreciated that during this alternate feed stroke, the oil will be metered into the cap end 38 of the cylinder in order to provide the incremental movement of the gripper 10 through the piston 17.

The positioning of the valve spools and the direction of fluid flow during the rapid return stroke are illustrated in Fig. 23. During this stroke, the solenoid at the left hand end of the valve 25 is energized to shift the spool 35 toward the left, the valve 26 is energized, and the valve 27 is de-energized. With the valves in these positions, the rod end 39 of the cylinder 16 is connected to the high pressure fluid source while the cap end 38 of the cylinder is connected to the low pressure reservoir 19, thereby urging the piston 17 toward the cap end of the cylinder and rapidly moving the gripper assembly 10 rearwardly to permit another slab or loaf of substance to be sliced for the next slicing operation.

The shifting of the spool 35 in valve 25 intercommunicates the high pressure port 34 with the port 43 which leads to the rod end of the cylinder; while the low pressure port 54 leading to the reservoir 19 is intercommunicated with the port 36 which is connected to the cap end of the cylinder by the line 37a. In order to maintain a fluid supply in the metering pump 21, the high pressure line 31 permits flow of fluid to the intake port 49 of the pump through the line 52a; while the outlet port 51 of the pump is connected to the low pressure port 54 of the valve 25 through the line 48a, intercommunicating ports 47 and 44 of valve 26, line 42, and the communicating port 36. Therefore, a supply of fluid is maintained to the continuously operating metering pump 21.

The position of the valve spools during stop feed and the fluid flow is illustrated in Fig. 24. During this setting, all of the valves are in de-energized positions. The port 36 of the valve 25 which leads to the cap end 38 of the cylinder through the line 37a is blocked. This port 36 also leads to the blocked port 44 of the valve 26 through the line 42 and the blocked port 41a of the valve 27 through the line 41. Therefore, the cap end of the cylinder is completely blocked and the fluid therein is trapped, thereby precluding movement of the piston in either direction. Again, in order to maintain an oil supply at the metering pump, the inlet 49 of the pump is connected to the high pressure fluid source of the line 29 and the line 33 through the lines 31 and 52a; while the outlet 51 is connected back to the high pressure fluid source through the line 48a, the intercommunicating ports 47 and 32a of the valve 26, and the line 32 which leads to the high pressure chamber of the connection block 30. Hence, the metering pump is permitted to continue its operation by simply receiving fluid from the high pressure source and returning the fluid thereto.

Fig. 25 illustrates the position of the valve spools and the flow of the hydraulic fluid during the rapid forward stroke. It will be noted that the position of these valves is the same during the rapid forward stroke of the hydraulic arrangement of Fig. 15, wherein the valve 25 is de-energized, the valve 26 is energized, and the valve 27 is energized. As already explained, this stroke is utilized at the commencement of the slicing cycle wherein it is desirable to rapidly advance forwardly the substance to the slicing position. With the valves positioned as seen in Fig. 25, both the cap end 38 and the rod end 39 are connected to the same high pressure source of fluid, but due to the greater area on the piston 17 at the cap end of the cylinder, a greater force is exerted thereon to thereby move the piston 17 and the gripper assembly 10 forwardly at a relatively rapid rate. Specifically, the high pressure fluid chamber in the connection block 30 and the high pressure port 34 of the valve 25 are connected to the intake port 49 of the metering pump through the lines 31 and 52a, as well as being connected to the cap end of the cylinder through the communicating ports 53 and 41a of the energized valve 27, the line 41, the port 36 of the de-energized valve 25, and the line 37a. The outlet 51 of the pump 21 is also connected to the port 36 of the valve 25 through the line 48a, the intercommunicating ports 47 and 44 of the energized valve 26, and the line 42, thereby dumping the oil from the metering valve back into the high pressure fluid source. The rod end of the cylinder is also connected to the high pressure fluid chamber of the connection block 30 through the line 40a, intercommunicating ports 34 and 43 of the de-energized valve 25, and the high pressure chamber of the connection block 30. Accordingly, a net flow of high pressure fluid will be received in the cap end of the cylinder in order to provide a rapid forward stroke.

*Metering pump*

As shown in Figs. 10, 11, and 12 the metering pump includes a cylinder block 55 wherein is bored a cylinder 56 internal thereof. A piston 57 is slidably positioned within the cylinder 56 and a compression spring 58 is positioned within the cylinder to urge the piston upwardly and outwardly thereof. The bottom or enlarged base portion 59 of the cylinder 56 may be enlarged or of increased diameter. The valve 50 associated with the metering pump 21 contains an internally bored cylinder 60 within which is fitted a valve spool 61. The pump cylinder 56 is connected to the valve cylinder 60 by a port 62 and the spool 61 is arranged such that the port 62 is never obstructed thereby. The valve 50 further contains the intake port 49 and the outlet port 51 each of which is fitted with a suitable threaded attachment, Fig. 10, to which the hydraulic lines 48 and 52 may be secured. The valve 50 may be rigidly secured to the cylinder block 55 by means such as studs 64. The pump will thus be operable when the piston 57 is reciprocated upwardly and downwardly and when the valve spool 61 likewise reciprocates upwardly and downwardly to alternately uncover the ports 49 and 51 whereby the hydraulic fluid may enter through the ports 49 and 62 as the piston 57 moves upwardly and whereby the fluid is ejected from the pump through the ports 62 and 51 when the piston moves downwardly and the spool 61 is raised to uncover the port 51 and to cover the port 49.

The pump 21 is driven by a reciprocatory drive means which includes generally the knife shaft 8 and eccentric 65 and a pair of cams 66 all of which are secured to and rotatable with the knife shaft 8 by means of a key 67 and cooperating keyways 68. The cams 66 are identical in configuration providing quick rise and dwell and quick fall and dwell. A cam follower 69, Fig. 12, is generally fork-shaped and includes a pair of ball bearing rollers 70 rotatably mounted in slots 71 at the end of cam follower member 69 by means of pins 72. The cam follower 69 further includes a downwardly projecting cylindrical extension 73 which extends into the valve cylinder 60 and engages the valve spool 61. The valve spool 61 is urged upwardly by a compression spring 74, Fig. 10.

The bifurcated or forked cam follower is slidably mounted in a slideway 75 which may be machined from extending parts of the cylinder block 55, Fig. 12. A generally U-shaped slide cover 76 may be rigidly attached to the extending parts of the cylinder block by means such as machine screws 77. The cam follower being bifurcated may ride against the outside of the cams 66 which are positioned outwardly of the eccentric 65 and therefore the valve and pump, being symmetrical, will have no tendency to twist or become mis-aligned.

It will be appreciated that the compression spring 74 urges the valve spool 61 upwardly within the valve cylinder 60 and further urges the cam follower upwardly within the slideway 75 such that the cam rollers 70 are firmly engaged against the cams 66. As the knife shaft 8 rotates, the cams likewise rotate and the cam follower 69, together with the valve spool 61, will reciprocate upwardly and downwardly in synchronism with the rotation of the knife shaft 8 and therefore in synchronism with the slicing operations of the knife 6 which revolves therewith.

The piston 57 is also reciprocated by the reciprocal drive means including the eccentric 65, a yoke 78 encircling the eccentric and a lever 79 coupled between the yoke 78 and the piston 57. The yoke 78 is rotatably mounted about the eccentric by a bearing means such as the ball bearings 80. The lever 79 may be pivotally attached to the yoke 78 by means of a bracket 81 and a stud shaft or pin 82 which may extend through a hole 83 at the end of the lever and a pair of cooperating holes 84 on the bracket 81, Fig. 12. Although the bracket 81 could be integrally formed with the yoke 78, it may also be rigidly attached thereto by means such as machine screws 85. The piston 57 extends upwardly above the cylinder block 55 and is bifurcated at the upper end thereof to provide a pivotal attachment with the end of the lever 79 remote from the yoke. The pivotal attachment may include a pin 86 extending through holes 87 in the bifurcated end of the piston 57 and through a hole 88 in the end of the lever 79.

A fulcrum member 89 is slidably mounted in a slideway 90 positioned horizontally across the upper part of the cylinder block 55, Figs. 10 and 12. The fulcrum member includes a pair of spaced apart downwardly extending lugs 91 having holes therein which determine a pivotal axis. A rock block 92 is positioned between the lugs 91 and held therebetween by a pivot pin 93. The lower surface of the rock block 92 is adapted for slidable engagement against the upper surface of the lever 79, Fig. 10. While not shown, it may be appreciated that other arrangements may be employed in place of the rock block and pin in order to vary the fulcrum of the lever 79 such as a roller and pin or a projected surface from the fulcrum member 89. The spring 58 cooperates with the fluid pressure within the cyinder 56 to urge the piston upwardly whereby the lever 79 abuts against the rock block 92 and is held in place, to rock about the pivotal axis determined by the pin 93 which constitutes a part of the lever member 89. Thus, as the knife shaft 8 rotates, the yoke 78 including the bracket 81 attached thereto, reciprocates upwardly and downwardly, the lever 79 rocks about the pivot point 93 determined by the positioning of the fulcrum member 89 and the reciprocatory motion is transmitted to the piston 57. It will be appreciated that the motion of the piston 57 as well as the motion of the spool 61 is derived from the rotation of the knife shaft 8 and therefore, the pump operates synchronously with the slicing operation of the knife 6.

The fulcrum member 89 may be moved longitudinally of the lever 79 by a control means which comprises a threaded shaft 94 threadingly engaged with the fulcrum member 89, Fig. 10. Thus, as the shaft 94 is rotated by means such as a control knob 95, a collar 96, Fig. 12, functions with stand-in thrust forces and thereby the fulcrum member 89 is adjustably moved along the lever 79. By controlled movement of the fulcrum member 89, the pivot point 93 about which the lever 79 will rock, may be moved from one position such as about midway between the pivotal pins 82 and 86 of the lever 79 and another position such as a point adjacent the pivotal pin 86 at the piston end of the lever 79. When the pivot point 93 is positioned approximately midway of the lever, the piston 57 receives a relatively long reciprocatory motion which is substantially equal to the reciprocatory motion developed by the yoke 78. A stroke greater than that of the yoke may be developed by positioning the pivot point 93 between the midway point and the pin 82. When the pivot point 93 is substantially at the piston end of the lever 79 adjacent the pin 86, the reciprocatory motion applied to the piston 57 is at a minimum and may even be reduced to zero. Thus, by rotation of the knob 95, the displacement of the piston 57 and control of the slice thickness may be smoothly controlled between the maximum and zero amounts. It will be appreciated that changing of the slice thickness will not change the timing between the gripper and the knife.

The movement of the piston 57 determines the displacement thereof and the incremental amount of fluid pumped with each revolution of the slicing knife 6. Since the incremental amounts of fluid passed by the metering pump 21 with each stroke thereof determines the movement of the piston 17 in the cylinder 16, Fig. 13, during the feed stroke of the piston 17 and of the gripper assembly 10, the slice thickness of the slicing machine is thereby controlled. Since there is no metering through an orifice, the viscosity of the fluid may vary greatly without effecting the predetermined slice thickness.

The metering pump 21 is mounted in a stationary position against a part of the machine frame 97, Fig. 12; a bottom plate holding the springs 58 and 74 may be attached to the cylinder block 75 by means such as machine screws 98 and a top cover plate 99 may be similarly attached to the top portion of the cylinder block 55 enclosing the slideway 90 wherein the fulcrum member 89 is slidably mounted.

Hold-down device

As the substance to be sliced is fed to the slicing knife 6, it is desirable that means be provided for firmly securing or pressing the substance downwardly against the bed 5, Fig. 1, to facilitate the slicing operation. The hold-down device 100 comprises generally a frame 101, Figs. 4 and 5, to which are attached a plurality of hold-down fingers 102 extending downwardly and forwardly therefrom into close spaced relation with the knife slicing position. The frame 101 extends transversely across and above the bed 5 of the machine and is mounted to move vertically such that it may be raised over the bed 5 to provide access to the slicing knife, as shown in Fig. 3.

Figure 6:
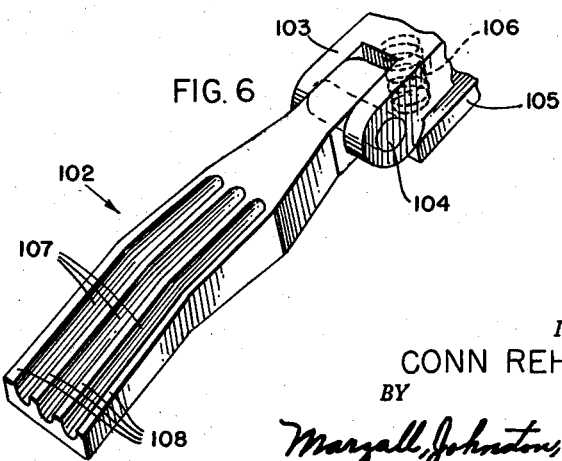
Fig. 6 is an enlarged fragmentary perspective view along the plane 6—6 of Fig. 5 and showing particularly the structure of the underside of a single hold-down finger.

Each hold-down finger 102 is pivotally mounted in a bracket 103 which is fixed to the frame 101. As shown in Fig. 6, the forward end of the bracket is bifurcated and bored to hold a pivotal pin 104 extending thereto and through the finger 102 to provide the pivotal mounting thereof. Each finger 102 contains an integrally formed rearward extension 105 positioned in spaced relation over a base part of the bracket 103. A compression spring 106 is interposed between the rearward extension 105 of the finger 102 and the bracket 103 and thereby the rearward extension 105 is urged upwardly and the forward part of the finger 102 will press downwardly and resiliently against the substance to be sliced. Thus, the finger 102 with the compression spring 106 associated therewith will resiliently press against the substance to be sliced.

The forward end of the finger 102 has a bottom surface containing a plurality of longitudinally extending grooves 107 and alternate longitudinal ridges 108, Fig. 6. The bottom surface thus formed may press against the meat or substance to be sliced without creating excessive frictional drag therewith.

Figure 3:
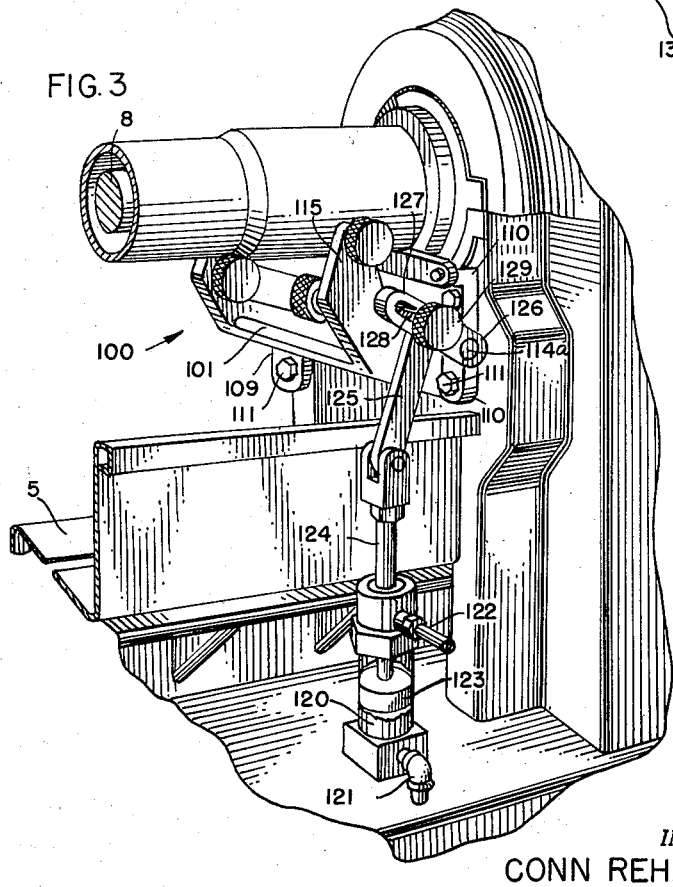
Fig. 3 is an enlarged fragmentary perspective view along the line 3—3 of Fig. 1 and showing particularly a hydraulic mechanism for operating the hold-down device.
Figure 4:
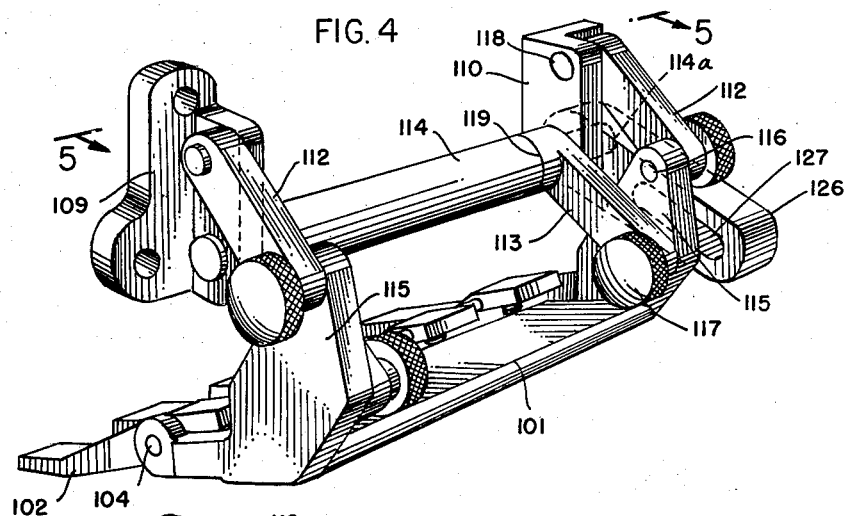
Fig. 4 is a perspective view of the device for hydraulic depressing or holding down the slab or substance to be sliced.
Figure 5:
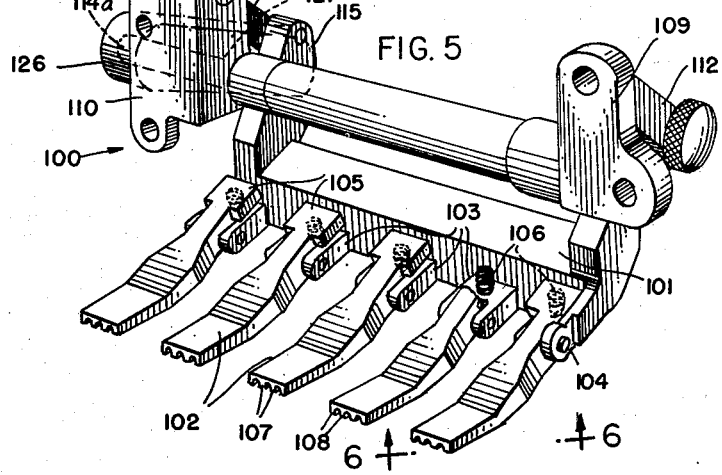
Fig. 5 is a perspective view along the line 5—5 of Fig. 4 and illustrating particularly the finger arrangement of the depressor or hold-down device.

The frame 101 is supported from a pair of brackets 109 and 110, Figs. 4 and 5, which may be rigidly attached to the stationary frame of the slicing machine by means such as bolts 111, Fig. 3. The specific supporting means includes a pair of opposed link members 112 and a pair of opposed link members 113 at each end thereof, Figs. 4 and 5. The lower link members 113 may be secured to a rotatably mounted shaft 114 or formed integrally therewith such that the link members 113 will remain parallel with each other and thereby the supporting frame member 101 will remain horizontal. The frame member 101 includes an upstanding part 115 integrally formed therewith and having pivot points 116 and 117 spaced apart vertically from each other. The brackets 109 and 110 similarly have pivot points 118 and 119 which are spaced apart vertically the same as the pivot points 116 and 117. Thus, it will be appreciated that the links 112 and 113 and the upstanding frame part 115 constitute a parallelogram support for the frame whereby the frame 101 may move vertically with respect to the bed 5 of the machine without pivoting or tilting.

The hold-down device 100 is operated from a stationary hydraulic cylinder 120, Fig. 3. Hydraulic fluid under pressure may enter at either end of the cylinder 120 through hydraulic connections 121 and 122 and may raise or lower the piston 123 therein. The piston 123 is coupled to move the hold-down device 100 vertically by means of a linkage comprising a piston rod 124 which is pivotally connected to a link 125. The link 125 is connected by adjustable means to a link 126 which is keyed to an extension 114a of the rotatably mounted shaft 114, Figs. 3 and 4. When pressure is applied against the underside of the piston 123, the piston will raise the frame member 101 through the linkage 124—126; and when pressure is applied to the upper side of the piston 123 through the connection 122, the frame 101 will move downwardly and the fingers 102 will press against the substance to be sliced with a force determined by the amount of fluid pressure and by an adjustment which may be made in the connection between the links 125 and 126. The link 126 may contain a slotted hole or elongated connection point 127 to which the link 125 is pivotally connected by a threaded adjusting means 128 adjustable by rotation of a knurled knob 129. If the connecting point and knob 129 are moved rearwardly of the link 126, the force exerted by the piston 123 through the linkage 124, 125, 126, will be increased such that the hold-down fingers 102 will press more firmly against the substance to be sliced. On the other hand, if the threaded means 128 and knob 129 were moved forwardly along the link 126, the force transmitted therealong and the downward force exerted by the fingers 102 will be decreased. Thus, the threaded means 128 and the adjusting knob 129 constitutes a pressure or force control means for varying the force exerted downwardly against the substance to be sliced by the fingers 102.

Control arrangement

Figure 2:
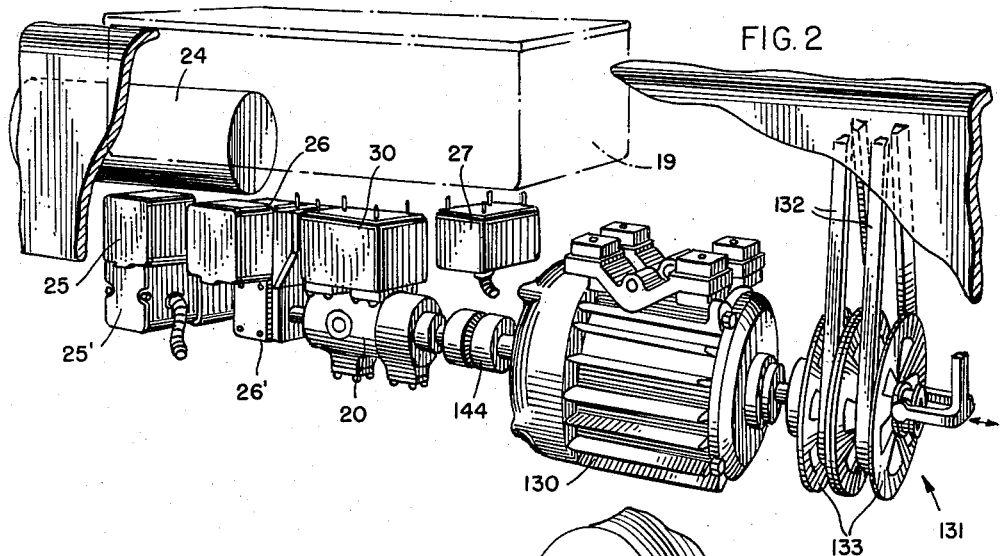
Fig. 2 is an enlarged fragmentary portion of Fig. 1 wherein a part of the machine frame is broken away to reveal the underlying apparatus.

As may be seen in Figs. 1 and 2, the driving or motivating power for the machine generally is furnished by a motor 130. The motor is drivingly coupled at one end thereof to a variable speed driving means 131 which includes V-belts 132 trained around drive pulleys 133, Fig. 2, and driven pulleys (not shown) mounted on the knife shaft 8 within the upstanding pedestal 4. The speed of the knife shaft may be controlled by a variable speed arrangement whereby the effective diameter of the drive pulleys 133 and the driven pulleys are varied, such a variable speed arrangement being well known. The variable speed means 131 may be controlled by rotating a control knob 134, Fig. 1, and the actual speed of the knife shaft 8 is indicated by a tachometer 135 coupled to the shaft 8 by conventional means not shown.

Other manual controls shown in Fig. 1 are a control knob 136 coupled to operate a hydraulic reversing valve (not shown) which valve being operable to apply hydraulic fluid under pressure selectively to the cylinder 120, Fig. 3, through the hydraulic connections 121 and 122. The remainder of the operator control elements are electric push-buttons mounted on a panel 137, Figs. 1 and 7, for electrical control of the motor 130 and of the solenoid valves 25, 26, and 27.

Figure 9:
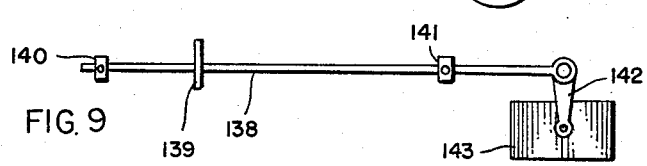
Fig. 9 is a schematic diagram illustrating the operation of a limit switch for automatically changing the stroke and reversing the movement of the hydraulic piston.

In addition to the manual controls positioned on or near the pedestal 4 of the slicing machine, an automatic control for reversing the hydraulic stroke and the gripper assembly 10 is provided in a slide rod 138, Figs. 1 and 9. As heretofore stated, the gripper assembly 10 has a downwardly extending part 13 and integral with the downwardly extending part is a slide rod engaging extension 139 which fits loosely about the slide rod 138. As the gripper assembly 10 moves longitudinally along the bed 5, the slide rod engaging extension 139 will move freely along the slide rod 138, but when the gripper assembly reaches an extreme limit of travel at either end of the bed 5, the extension 139 will engage an appropriate stop 140 or 141 attached to the rod 138. One end of the rod 138 is pivotally connected to an operating arm 142 of an electric switch 143. Contacts in the electric switch 143 will be open when the operating arm 142 is moved to the right (as shown in Fig. 9); and the contacts of the switch 143 will be closed when the operating arm is moved to the left. The switch is not mechanically biased and therefore both the open position and the closed position are stable; i.e., when closed, the switch will remain closed until a force on the operating arm causes it to open, and vice versa.

When the gripper assembly moves forward (to the left as shown in Fig. 1) in the feed cycle, the electric switch 143 will be unaffected until the limit of excursion is reached whereupon the extension 139 will engage the stop 140 and shift the rod 138 and the operating arm 132 of the switch 143 to the left, as shown in Fig. 9.

Thus, the switch 143 is automatically closed when the gripper assembly moves to an extreme forward position and thence the rapid reverse stroke will be initiated. During the rapid reverse stroke, the gripper assembly 10 will move to the right, Figs. 1 and 9, and at the extreme rearward excursion limit, the extension 139 will engage the stop 140 thereby moving the rod 138 and the operating arm 142 to the right, Fig. 8, to open the electric switch 143, thus ending the rapid return stroke.

The high pressure pump 20 and the solenoid valves 25, 26, and 27 are positioned beneath the bed 5 of the machine, Fig. 1, and beneath the reservoir 19 and the accumulator 24, Fig. 2. The motor 130 is coupled to drive the high pressure pump 20 through a mechanical coupling 144, Fig. 2.

Figure 7:
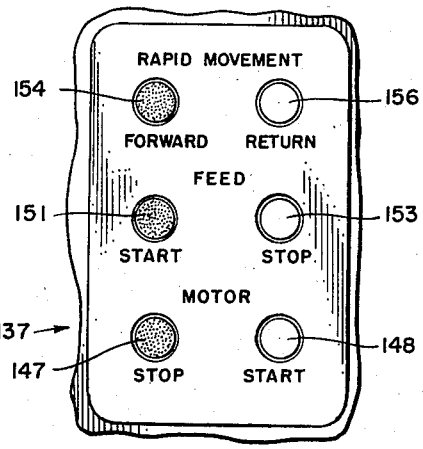
Fig. 7 is an enlarged front elevational view of an electrical control panel for the slicing machine shown generally in Fig. 1.
Figure 8:
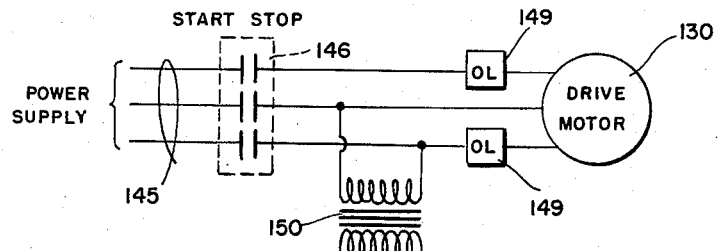
Fig. 8 is a schematic diagram of the electrical circuit for controlling the slicing machine of this invention.

The electrical controls for the slicing machine may be best understood with reference to Fig. 8 wherein is shown a power supply 145 which feeds to the drive motor 130 through the contacts of a stop-start switch 146 which is manually operated by push-buttons 147 and 148 on the control panel 137, Fig. 7. The drive motor 130 may be protected from overloads by means such as overload relays 149. A transformer 150 is connected to receive power from the 220 volt power supply 145 and will furnish a lower voltage needed for operation of solenoids 25', 26' and 27' associated with the solenoids valves 25, 26, and 27.

With the control switches and push-buttons open, as shown in Fig. 8, none of the solenoids 25', 26' and 27' are energized and therefore the valves 25, 26 and 27 are positioned as shown in Figs. 19 and 24 to produce the stop feed condition with the piston 17 and gripper assembly 10 held stationary. Thus, in the event of a power failure when no voltage is present in the voltage supply 145, the solenoids would be de-energized and a stop feed condition would result.

To initiate a feed cycle, a push button 151, Fig. 7, is depressed and a switch 152 is closed thereby. Closure of the switch 152 will energize the feed and stop feed solenoid 26' thereby shifting the valve 26 to an energized position, as shown in Figs. 13 and 21 whereby a feed stroke will result. If a push-button 153, Fig. 7, is depressed, the switch 152 is thereby opened and the stop feed condition of Figs. 19 and 24 will result.

Rapid forward movement of the gripper assembly 10 is effected by depressing the push-button 154, Fig. 7, which closes normally open contacts 155 and normally open contacts 152, Fig. 8, thereby energizing the forward solenoid 27' through the normally closed contacts 157 to shift the positioning of the solenoid valve 27 and energizing the stop and feed solenoid 26' to shift the position of the solenoid valve 26 and cause the rapid forward stroke, as illustrated in Figs. 15 and 25. If the push-button 154 remains un-depressed and it is desired to cause rapid return movement of the gripper assembly 10, a push-button 156, Fig. 7, is depressed to thereby close normally open contacts 158 and energize the return solenoid 25', and close normally open contacts 152 and energize the solenoid 26, thereby effecting a rapid return stroke, as seen in Figs. 17 and 23. This rapid return stroke will also be effected when the push-button 156 remains un-depressed and the limit switch 143 is automatically actuated to a closed position by the slide rod 138. The limit switch 143 is electrically connected in parallel to the contacts 158 of the rapid return button 156, Fig. 8. Actuation of the limit switch 143 effects energization of the return solenoid 25' and the stop and feed solenoid 26' to effect the return stroke.

Depressing of the push-button 156 simultaneously closes the contacts 158 and opens the contacts 157, thereby preventing the energization of the forward solenoid 27' should the push-button 154 be depressed to close the contacts 155. This electrical hook up precludes the possibility of simultaneously energizing the return solenoid 25' and the forward solenoid 27' which would cause rapid mixing of the high pressure hydraulic fluid to be metered, this condition being clearly undesirable. Thus, should both rapid movement buttons 154 and 156 be depressed simultaneously, the gripper will return rather than move forward.

During normal operation of the machine, it will probably be in feed position during the time that the rapid forward and return movements, as well as the automatic return movements are taking place. However, it should be appreciated that the rapid forward and return movements may be achieved even though the machine is not in feeding position.

Modified metering pump

Referring now particularly to Figs. 26 and 27, a modified metering pump, generally designated by the numeral 21A, is illustrated which may be substituted for the metering pump 21 generally shown in Figs. 10, 11, and 12. This pump is also of the variable stroke type, being employed on the slicing machine to obtain slice thickness control. Broadly, this pump obtains the same results as obtained by the metering pump 21 in that it passes incremental amounts of oil to or from the actuating cylinder 16 for advancing the gripper 10.

This metering pump 21 includes a housing 160 having a pumping chamber 161 therein. Communicating with the pumping chamber 161 is an intake or inlet port 162 and an outlet or exhaust port 163. At the inlet port 162, a spring biased check valve 164 permits uniflow of oil into the pumping chamber 161 from the line 52, while a spring biased check valve 165 at the outlet port 163 permits uniflow of the oil out of the pumping chamber 161 and into the line 48. Leading from the top of the pumping chamber 161 and through the housing is a bore 166 which slidably receives a pumping plunger 167. A spring 168 is bottomed in a recess within the housing at one end and bears against the pumping end of the plunger 167 at the other end to constantly bias the plunger out of the pumping chamber 161. The plunger 167 is bifurcated at its outer end and provided with a roller 169 mounted on a pin 170.

In order to effect reciprocation of the pumping plunger 167 and actuation of the metering pump 21A, the roller 169 on the plunger engages the outer arcuate surface 171 of a cam follower or rider 172. One end of the cam rider 172 is pivotally mounted to a substantially semicircular stroke control plate 173 by a pin 174. The stroke control plate 173 is rotatably journalled on the drive shaft 8. The other end of the cam rider 172 carries a rotatably mounted roller 175 which engages a cam or eccentric 176 keyed to the power shaft 8 for rotation therewith. Rotation of the power shaft 8 rotates the cam or eccentric 176 thereby imparting an oscillating motion to the cam rider 172, which, in turn, imparts a reciprocatory motion to the pump plunger 167. As the pump plunger 167 makes its downward stroke into the pumping chamber 161, fluid is forced out of the pumping chamber and the outlet port 163 through the check valve 165 to be carried away in the line 48. On the upward stroke of the plunger 167, the check valve 165 is maintained in closed position and the check valve 164 at the inlet port 162 opens to allow the flow of oil into the pumping chamber from the line 52. The dotted and solid line showings of the cam 176 and the cam rider 172 indicates the movement and the position of these parts at their approximate extremities.

Variation in the stroke of the plunger 167 may be effected by variation in the movement of the engageable part of the cam rider 172 with the plunger roller 169, and may be changed by rotation of the stroke control plate 173 relative to the shaft 8 when it is standing still. This movement may be effected by a worm gear segment 177 secured to the stroke control plate 173 and engaging the worm 178 on the control shaft 179. Rotation of the control shaft 179 varies the position of the stroke control plate 173 and the point on the cam rider 172 which contacts the plunger roller 169, as noted in Fig. 27. As the point of contact between the plunger roller 169 and the cam rider surface 171 moves from the end of the cam rider mounting the roller 175 to the end of the cam rider pivotally mounted at 174, the stroke of the plunger decreases from a maximum to a minimum, thereby varying the incremental amount of oil pumped out of the pumping chamber 161.

As seen in Figs. 26 and 27, the plunger 167 is in its uppermost position. When the eccentric or cam 176 is rotated by the shaft 8, the cam rider 172 forces the plunger 167 down into the pumping chamber 161 keeping the check valve 164 at the intake port closed and opening the check valve 165 at the outlet port, thus allowing a metered amount of oil to be forced into the cap end of the cylinder or be taken from the rod end of the cylinder and causing a desired movement of the gripper 10. At the bottom of the stroke of the plunger 167 at the moment the plunger has been forced down to its lowermost position, the check valve 165 at the outlet port will close; and the instant the plunger starts to move upwardly, a vaccum will be created opening the check valve 164 at the inlet port thereby permitting oil to enter the pumping chamber 161 until the plunger reaches its uppermost point. A given oil pressure will be continually urged against the check valve 164 at the inlet port at all times in order to counteract the vacuum effect.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A hydraulic feed apparatus comprising a cylinder having a piston therein, a reservoir containing hydraulic fluid at low pressure, a high pressure pump, a first valve hydraulically coupled between the cylinder and the high pressure pump for applying the high pressure fluid to a selected end of the cylinder, a metering pump for passing hydraulic fluid in predetermined incremental amounts, a second valve hydraulically coupled between the metering pump and a first end of the cylinder for permitting the fluid to exhaust from the cylinder in incremental amounts through the metering pump, and a third valve coupled to the metering pump for selectively permitting hydraulic fluid passing through the metering pump to bypass the cylinder, said first valve being operable in a first position to pass high pressure fluid from the high pressure pump to the second end of the cylinder, while the second valve permits incremental amounts of fluid to be exhausted from the first end thereof for effecting a feed stroke wherein the piston moves forwardly in successive incremental steps, said first valve being operable in a second position to pass high pressure fluid from the high pressure pump to the first end of the cylinder and to pass hydraulic fluid from the second end of the cylinder to a low pressure reservoir thereby effecting a rapid return stroke of the piston, said third valve being operable to bypass hydraulic fluid from the metering pump to effect a stop feed wherein the piston remains stationary within the cylinder.

2. A hydraulic feed apparatus for a slicing machine, said apparatus comprising a cylinder having a piston therein, said piston having a rod side and a cap side, the rod side of said piston having an area which is substantially less than the area of the cap side, a reservoir containing hydraulic fluid at low pressure, a high pressure pump for developing high pressure in the hydraulic fluid, a first valve hydraulically coupled between the cylinder and the high pressure pump for applying high pressure fluid to a selected end of the cylinder, a metering pump for passing hydraulic fluid in predetermined incremental amounts, and further selective valve means hydraulically coupled to the metering pump and to the cylinder, said first valve being operable in a first position to pass high pressure fluid from the high pressure pump to the cap end of the cylinder while the further selective valve means is operable to pass the metered quantities of hydraulic fluid from the rod end of the cylinder to effect a feed stroke wherein the piston moves forwardly by successive incremental steps, said first valve being operable in a second position to pass high pressure hydraulic fluid from the high pressure pump to the cap end of the cylinder while the further selective valve means is operable to pass the metered quantities of hydraulic fluid from the rod end of the cylinder to effect a feed stroke wherein the piston moves forwardly by successive incremental steps, said first valve being operable in a second position to pass high pressure hydraulic fluid from the high pressure pump to the rod end of the cylinder and to pass hydraulic fluid from the cap end of the cylinder to the low pressure reservoir thereby effecting a rapid return stroke of the piston, said further valve means being operable to bypass fluid from the metering pump and to hydraulically couple both ends of the cylinder to the high pressure pump thereby effecting a rapid forward stroke of the piston wherein the piston moves forwardly with high pressure exerted against both sides thereof but with a greater force being applied to the cap side because of the greater area of the cap side as compared to the rod side.

3. A hydraulic feed apparatus for a slicing machine, said apparatus comprising a cylinder having a piston therein, a reservoir containing hydraulic fluid at low pressure, a high pressure pump for developing a high pressure in the hydraulic fluid, an accumulator hydraulically coupled to the high pressure pump for storing the fluid at high pressure, a metering pump for passing hydraulic fluid in controlled incremental amounts, said metering pump being hydraulically coupled to the high pressure pump and the accumulator whereby fluid discharged from the metering pump will pass to the high pressure fluid stored in the accumulator, a first solenoid valve coupled to the high pressure fluid of the accumulator and to the cylinder, said first solenoid valve being operable to pass high pressure fluid into a cap end of said cylinder when in a de-energized state, said first solenoid valve being operable to pass high pressure fluid to a rod end of the cylinder and to connect the cap end to the low pressure reservoir when in an energized state whereby energization of the first solenoid valve will cause a rapid return stroke of the piston, a second solenoid valve hydraulically coupled to the intake of the metering pump, said second solenoid valve being operable to pass high pressure fluid to the intake of the pump when in a de-energized state and being operable to connect the rod end of the cylinder to the intake of the pump when in an energized state whereby the energization of the second solenoid valve causes a feed stroke wherein the piston moves with controlled increments of travel.

4. A hydraulic feed apparatus for a slicing machine, said apparatus comprising a cylinder having a piston therein, a reservoir containing hydraulic fluid at low pressure, a high pressure pump for developing a high pressure in the hydraulic fluid, an accumulator hydraulically coupled to the high pressure pump for storing the fluid at high pressure, a metering pump for passing hydraulic fluid in controlled incremental amounts, said metering pump being hydraulically coupled to the high pressure pump and the accumulator whereby fluid discharged from the metering pump will pass to the high pressure fluid stored in the accumulator, a first solenoid valve coupled to the high pressure fluid of the accumulator and to the cylinder, said first solenoid valve being operable to pass high pressure fluid into a cap end of said cylinder when in a de-energized state, said first solenoid valve being operable to pass high pressure fluid to a rod end of the cylinder and to connect the cap end to the low pressure reservoir when in an energized state whereby energization of the first solenoid valve will cause a rapid return stroke of the piston, a second solenoid valve hydraulically coupled to the intake of the metering pump, said second solenoid valve being operable to pass high pressure fluid to the intake of the pump when in a de-energized state and being operable to connect the rod end of the cylinder to the intake of the pump when in an energized state whereby the energization of the second solenoid valve causes a feed stroke wherein the piston moves with controlled increments of travel, and a third solenoid valve coupled between the high pressure accumulator and the rod end of the cylinder, said third solenoid valve being operable to connect the rod end of the cylinder to the high pressure accumulator when in an energized state to thereby effect a rapid forward stroke wherein the high pressure is applied to both sides of the cylinder.

5. In a slicing machine, hydraulic apparatus for feeding a substance to a slicing knife for slicing thereof, said apparatus including an actuating cylinder having a piston and rod assembly movable therein, a substance engaging device connected to said piston and rod assembly and movable therewith, a reservoir for containing hydraulic fluid at low pressure, a pump communicating at the inlet side thereof with said reservoir for developing high pressure fluid, a first valve coupled between the pump and the cylinder for selectively connecting the high pressure fluid source to one end of the cylinder, a metering pump for passing measured incremental amounts of fluid, said metering pump having inlet and outlet ports, a second valve coupled between said first valve and one of said ports for selectively connecting one of said ports with one end of the cylinder, and a third valve coupled between the other port of said metering pump and said first valve for selectively connecting the other of said ports with one end of the cylinder.

6. In a slicing machine, hydraulic apparatus for feeding a substance to a slicing knife for slicing thereof, said apparatus including an actuating cylinder having a piston and rod assembly movable therein, a substance engaging device connected to said piston and rod assembly and movable therewith, a reservoir for containing hydraulic fluid at low pressure, a pump communicating at the inlet side thereof with said reservoir for developing high pressure fluid, a first valve coupled between the pump and the cylinder for selectively connecting the high pressure fluid source to one end of the cylinder, a metering pump for passing measured incremental amounts of fluid, said metering pump having inlet and outlet ports, a second valve coupled between said first valve and said outlet port for selectively connecting the outlet port with one end of the cylinder, and a third valve coupled between the inlet port of said metering pump and said first valve for selectively connecting the inlet port with the other end of the cylinder, whereby hydraulic fluid may be metered into the end of the cylinder on the side of the piston having the greatest area subjected to the fluid.

7. In a slicing machine, hydraulic apparatus for feeding a substance to a slicing knife for slicing thereof, said apparatus including an actuating cylinder having a piston and rod assembly movable therein, a substance engaging device connected to said piston and rod assembly and movable therewith, a reservoir containing hydraulic fluid at low pressure, a pump communicating at the inlet side thereof with said reservoir for developing high pressure fluid, a first valve coupled between the pump and the cylinder for selectively connecting the high pressure fluid source to one end of the cylinder, a metering pump for passing measured incremental amounts of fluid, said metering pump having inlet and outlet ports, a second valve coupled between said first valve and said inlet port for selectively connecting the inlet port with one end of the cylinder, and a third valve coupled between the outlet port of the metering pump and said first valve for selectively connecting the outlet port with the other end of the cylinder, whereby hydraulic fluid may be metered from the end of the cylinder on the side of the piston having the lesser area subjected to the fluid.

8. A hydraulic feed apparatus for a slicing machine, said apparatus comprising a cylinder having a piston therein, said piston having a rod side and a cap side, the rod side of said piston having an area which is substantially less than the area on the cap side, a reservoir containing hydraulic fluid at low pressure, a high pressure pump for developing high pressure in the hydraulic fluid, a first valve hydraulically coupled between the cylinder and the high pressure pump for applying high pressure fluid to a selected end of the cylinder, a metering pump for passing hydraulic fluid in predetermined incremental amounts, second and third valves hydraulically coupled to the metering pump and the first valve, said first valve being operable in a position to pass high pressure fluid from the high pressure pump to the cap side of said piston and to the inlet of said metering pump while the second valve is operable to pass metered quantities of hydraulic fluid to the cap end of the cylinder to effect the feed stroke wherein the piston moves forward by successive incremental steps, said first valve being operable in a second position to pass hydraulic fluid from the high pressure pump to the rod end of the cylinder and to pass hydraulic fluid from the cap end of the cylinder to the low pressure reservoir thereby effecting a rapid return stroke of the piston, and said third valve being operable to by-pass fluid from the metering pump and to hydraulically couple the cap side of the piston to the high pressure pump thereby effecting a rapid forward stroke of the piston.

References Cited in the file of this patent

UNITED STATES PATENTS

| | | |
|---|---|---|
| 1,719,693 | Ernst | July 2, 1929 |
| 1,832,694 | Ernst et al. | Nov. 17, 1931 |
| 1,835,976 | Ernst et al. | Dec. 8, 1931 |
| 2,019,486 | Ernst et al. | Nov. 5, 1935 |
| 2,126,421 | Stukart | Aug. 9, 1938 |
| 2,177,470 | Ahrndt | Oct. 24, 1939 |
| 2,183,436 | Towler et al. | Dec. 12, 1939 |
| 2,657,634 | Greenland et al. | Nov. 3, 1953 |
| 2,699,651 | Douglas | Jan. 18, 1955 |
| 2,713,772 | Horlacher | July 26, 1955 |